United States Patent Office 3,375,447

Patented Mar. 26, 1968

3,375,447

AUTOMATIC GAIN CONTROL CIRCUIT WITH DELAYED DECAY OF THE GAIN CONTROL SIGNAL

Theodorus van der Beek, Leiden, Netherlands, assignor, by mesne assignments, to North American Philips Company, Inc., New York, N.Y., a corporation of Delaware Filed Oct. 14, 1964, Ser. No. 403,748

Claims priority, application Netherlands, Nov. 29, 1963, 301,150

6 Claims. (Cl. 325—410)

ABSTRACT OF THE DISCLOSURE

An automatic gain control circuit comprising a memory circuit for storing a gain control voltage. A gate circuit is provided to discharge the memory circuit in response to the simultaneous occurrence of an output of a trigger circuit indicating the absence of an input signal, and the output of a monostable multivibrator connected to indicate the lapse of a predetermined period of time following the last occurrence of an input signal.

The invention relates to an automatic gain control circuit having delayed decay of the gain control signal.

For the reception of single side band transmissions with suppressed carrier and for the reception of C.W.-telegraphy, the use of a gain control circuit which responds to the mean signal level is impracticable, since no signal is present between the syllables and words in the case of a voice signal, and between the marks in the case of telegraphy. If the automatic gain control circuit has a relatively small discharge time constant, it will be able to follow level variations which have been caused by fading phenomena and the like, but the control signal would drop off between the marks or the words, as the case may be, so that noise would be made audible in a disturbing way and an objectionable crash would occur at the start of the following voice signal or mark, since due to the unavoidable lag, the automatic gain control circuit would not yet be fully operative at that instant. If on the other hand the time constant of discharge is large, the speech intervals and the intervals between marks are bridged satisfactorily, but at the end of a transmission the control voltage drops off far too slowly.

An object of this invention is to provide a device in which the control voltage is maintained substantially constant some period after the end of a voice signal or a series of telegraphy marks, after which it decays relatively rapidly. The circuit is thus an automatic gain control circuit having delayed decay of the control signal.

According to the invention the circuit comprises a trigger circuit which in the absence of a voice signal or a telegraphy mark assumes a quiescent condition and which in the presence thereof assumes an operative condition. The trigger circuit is coupled to a monostable multivibrator and at the start of a voice signal or a telegraphy mark returns the monostable multivibrator to its stable condition and at the end of a voice signal or a telegraphy mark brings the monostable multivibrator to its metastable condition. The circuit for generating the control voltage is supplied from the voice signals or the telegraphy marks and has a large discharge time constant and can be short-circuited through a switching device. The switching device is controlled by the trigger circuit and the multivibrator so that the short-circuit exists only as long as the trigger circuit remains in its quiescent condition and moreover the multivibrator remains in its stable condition.

In a device as described above, the control voltage becomes operative as soon as a voice portion or a telegraphy mark occurs and this control voltage remains operative substantially unchanged until a period which is determined by the duration of the metastable condition of the multivibrator has elapsed after the end of a voice portion or a telegraphy mark, in which period no further voice signal or telegraphy mark has occurred. At that instant the control voltage drops off rapidly.

A suitable duration for the decay delay, caused by the metastable condition of the multivibrator, has been found to be approximately 600 milliseconds.

These and other features of the invention will become more apparent after a perusal of the drawing, which represents an embodiment of a device according to the invention.

Figure 1:
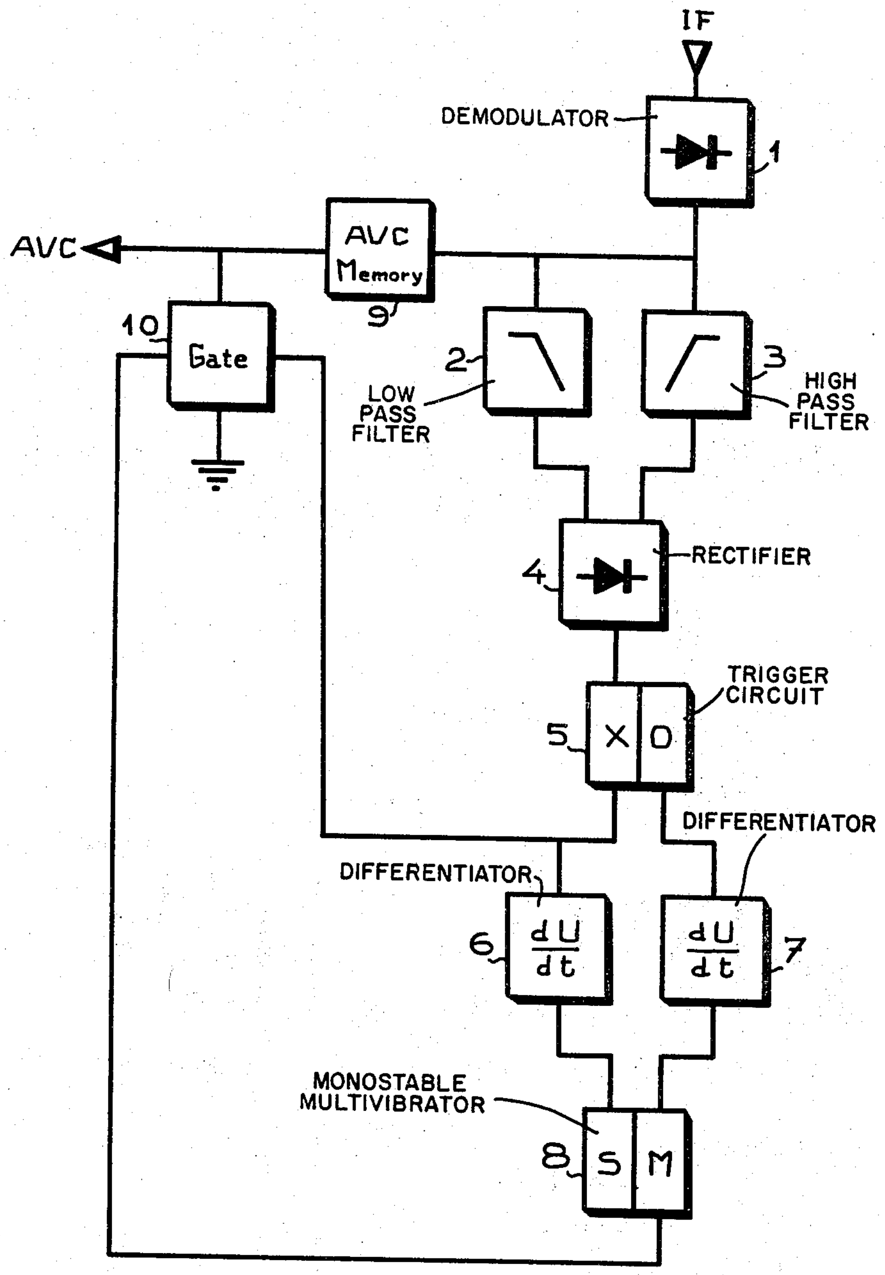
FIG. 1 is a block diagram of an automatic gain control circuit according to the invention.

In the figure, an intermediate frequency signal is applied to a demodulator 1. Such a signal has been shown at 1F in FIGURE 2. The speech signal or the telegraphy marks can, however, be obtained in other ways too, which can be of interest in audio-frequency compression and expansion circuits.

The voice signal or the telegraphy marks are applied in parallel to a low-pass filter 2 and a high-pass filter 3. In the case of voice signals, a suitable crossover point can be, for example, approximately 1500 c./s. The output signals of the filters 2 and 3 are applied to a rectifier in a bridge circuit. The bridge circuit is designed to produce an output signal of a first value when the output signals from filters 2 and 3 are absent or very weak, and to produce an output signal of a second value when the output signals from the two filters are of greater amplitude. The rectifier has a relatively small charging time constant and a relatively large discharge time constant, so that an output signal from the bridge circuit is generated as soon as a useful signal occurs. This output signal subsequently remains representative of the mean value of the useful signal, so that the output signal does not materially vary during very short signal intervals (e.g. the intervals between the syllables of a spoken word).

The part of the circuit including the filters and bridge circuit provides discrimination between useful signals and noise, and it is also prevents the circuit for effecting a delayed decay of the gain control voltage, which will be described below, from becoming operative at each very short interruption of the useful signal.

The output signal of the rectifier 4 sets a trigger circuit 5 in the operative condition X (waveform 5 in FIG. 2) as soon as it exceeds a predetermined value, corresponding to the presence of a useful signal.

The trigger circuit provides well-defined steep waveform edges at the start and the end respectively of a useful signal, and the trigger circuit is coupled by way of differentiating circuits 6 and 7 respectively to a monostable multivibrator 8. The maximum duration of the metastable condition multivibrator 8 is equal to the desired minimum delay period for the decay of the control voltage, for example 600 milliseconds. As soon as the trigger circuit 5 returns to its quiescent condition O from its operative condition X, the monostable multivibrator 8 is set to its metastable condition M, and the multivibrator is returned to its stable condition S as soon as the trigger circuit 5 assumes the operative condition X, or, if this should not occur in time, the multivibrator returns to its stable condition S automatically after 600 milliseconds have elapsed (waveform 8 in FIG. 2).

Figure 2:
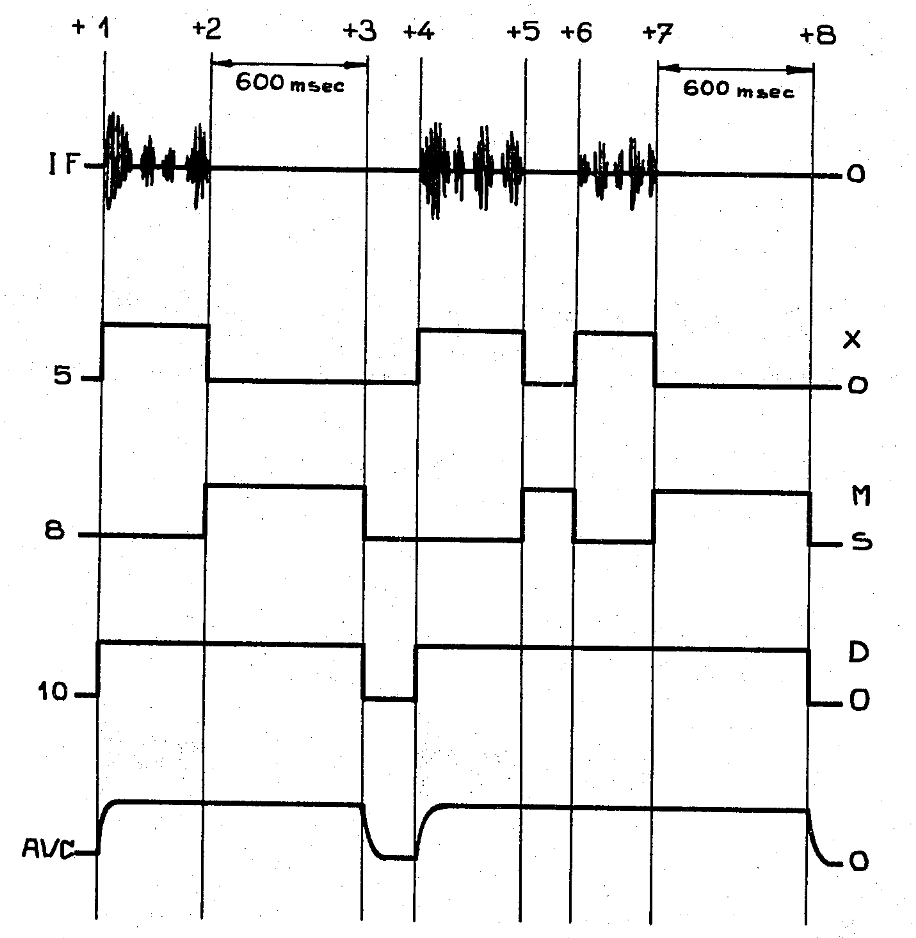
FIG. 2 is a diagram of some of the waveforms occurring in the circuit of FIG. 1.

In FIG. 2 a useful signal is present throughout the interval between the instant $t1$ and the instant $t2$ (with the exception of very short interruptions, which are bridged by the rectifier 4), and after the instant $t2$ until the instant $t4$ no further useful signal occurs. Between the instants $t1$ and $t2$ respectively, the trigger circuit 5 assumes the operative condition X, and when it reverts to its quiescent condition O, the monostable multivibrator 8 assumes the metastable condition M for 600 milliseconds (i.e. up to the instant $t3$) and subsequently reverts to its stable condition S.

At the instant $t4$ a further useful signal portion occurs, which lasts until the instant $t5$, so that the trigger circuit 5 assumes the operative condition X between the instants $t4$ and $t5$. At the instant $t5$, the trigger circuit 5 returns into its quiescent condition O, so that the monostable multivibrator 8 assumes the metastable condition M. Since at the instant $t6$ a further useful signal portion occurs, which again brings the trigger circuit 5 into its operative condition X, the multivibrator 8 is at that instant forced to return into its quiescent condition. At the end of the signal portion referred to, that is at the instant $t7$, the trigger circuit 5 reverts to its quiescent condition O, and the multivibrator 8 is set to its metastable condition M and remains in that condition until the instant 8.

The control voltage for the automatic gain control is derived from the signal source 1 by means of an AVC-memory 9 with a small charging time constant and a very large discharge time constant.

The output of the AVC-memory 9 can be short-circuited by means of a gate 10, which is controlled by the trigger circuit 5 and the monostable multivibrator 8, in such a way that the gate 10 remains open and the short-circuit is not present, as long as either the trigger circuit 5 is in its operative condition or the multivibrator 8 is in its metastable condition, which has been shown at 10 in FIG. 2.

The control voltage which rapidly develops at the start of each signal portion, is thereby maintained, until the start of the following signal portion, or, if this should not occur soon enough, during a period which is equal to the maximum metastable period of the multivibrator 8 (waveform AVC in FIG. 2).

The gate 10 can be designed in various ways. E.g., it is possible to make use of two separate gates, one of them being controlled by the trigger circuit 5 and the other being controlled by the multivibrator 8. It is essential, however, that the short-circuit of the AVC-control voltage is removed whenever either the trigger circuit 5 assumes the operative condition or the multivibrator 8 assumes the metastable condition.

Since many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

What I claim is:

1. An automatic gain control circuit for producing a gain control signal responsive to the amplitude of an input signal which may have quiescent periods, said gain control circuit comprising a source of said signals, memory circuit means connected to said source for producing said control signal, a trigger circuit, means connecting said source to said trigger circuit whereby said trigger circuit has a first conduction state during the absence of said input signals and a second conduction state during the occurrence of said input signals, monostable multivibrator means, means connecting said monostable multivibrator means to said trigger means whereby said monostable multivibrator means is set to its metastable state upon each change of state of said trigger circuit from said second state to said first state and said monostable multivibrator means is reset to its quiescent state upon each change of state of said trigger circuit from said first state to said second state, and gate circuit means connected to discharge said memory circuit means only in response to the simultaneous occurrence of said first state of said trigger circuit and said quiescent state of said multivibrator means.

2. An automatic gain control circuit for producing a gain control voltage responsive to the amplitude of an input signal which may have quiescent periods, said gain control circuit comprising a source of said signals, memory circuit means connected to said source for producing said gain control voltage, said memory circuit means having a short charging time constant and a large discharging time constant, a trigger circuit having first and second conduction states, means connecting said source to said trigger circuit whereby said trigger circuit has said first conduction state during the absence of said input signals and has said second conduction state when said input signals occur, a monostable multivibrator circuit having a metastable state of predetermined duration, means connecting said trigger circuit to said multivibrator circuit for triggering said multivibrator circuit to said metastable state whenever said trigger circuit changes from said second to said first conduction states, and for triggering said multivibrator circuit to its quiescent state whenever said trigger circuit changes from said first to second states, gate circuit means connected to discharge said memory circuit means, and means connecting said trigger circuit and said multivibrator circuit means to said gate means whereby said gate means discharges said memory circuit means only upon the simultaneous occurrence of said first conduction state of said trigger circuit and quiescent state of said multivibrator circuit.

3. The gain control circuit of claim 2 in which said means connecting said trigger circuit to said multivibrator circuit comprises differentiating circuit means.

4. The gain control circuit of claim 2 in which said means connecting said source to said trigger circuit comprises a rectifier circuit having a small charging time constant and a relatively larger discharging time constant, and filter means for applying said input signals to said rectifier circuit means, whereby said trigger circuit is unaffected by short interruptions of said input signals.

5. The gain control circuit of claim 4 in which said filter means comprises a low pass filter and a high pass filter connected to apply said input signals to said rectifier circuit in parallel.

6. The gain control circuit of claim 5 in which the crossover frequency of said low and high pass filters is approximately 1500 c.p.s.

References Cited

UNITED STATES PATENTS 3,329,902 7/1967 Lindt -------------- 325—410

KATHLEEN H. CLAFFY, *Primary Examiner.*

R. LINN, *Assistant Examiner.*